2,877,263
NITRATION CATALYST

George R. Thomas, Woodburn, Mass.

No Drawing. Application December 26, 1956
Serial No. 630,437

6 Claims. (Cl. 260—482)

This invention relates to the preparation of compounds of the type >N—NO$_2$, and more particularly to the nitration of substituted carbamic acid esters in the presence of a catalyst.

Heretofore in the preparation of the nitro derivatives of carbamic acid esters, it has been found necessary to use low temperatures and the products obtained were contaminated with undesirable by-products. (Curry and Mason, Journal of the American Chemical Society 73, 5043, 1951.) During these nitration processes fuming nitric acid was used to nitrate the ester, and acetic anhydride was used to remove the water.

It is an object of this invention to add a catalyst to the nitration reaction of carbamic acid esters which will promote the reaction.

It is also an object of this invention to add a catalyst to the carbamic acid ester nitration process that will prevent the formation of by-products.

It is still another object of this invention to add a catalyst for the nitration reaction which will increase the speed of the reaction so that a high yield will be obtained in a short length of time.

It has been found that in the process for the nitration of carbamic acid esters;

$$R'\overset{H}{N}-COOR + HNO_3 + Ac_2O \longrightarrow 2AcOH + R'\overset{NO_2}{N}-COOR$$

wherein one mole of the substituted ester is reacted with one mole of the nitric acid to produce one mole of the nitrated ester, excellent yields of the nitro-carbamate can be obtained by the use of an acid catalyst when practically the theoretical amount of nitric acid is used. This ratio of one mole of the acid to one mole of the ester produces the most economical results. In the above formula R' is a primary, secondary or tertiary alkyl group, and R is the residue of an alcohol. In this reaction, nitric acid is used as a nitrating agent and may be fuming nitric acid or concentrated nitric acid or nitrogen pentoxide. The acid anhydride may be acetic anhydride, propionic anhydride or any active anhydride which will react with the water present in the acid and that produced by the nitration to keep the system in an anhydrous condition.

It has been found that certain materials will catalyze this reaction to shorten the reaction time, increase the yield and avoid the production of by-products. These catalysts are broadly materials of an acid nature which when mixed with the anhydride and the acid produced therefrom, will be stronger than nitric acid is when mixed with the same materials.

Boron trifluoride has been found to act as a catalyst for this reaction, but the preferred catalysts are sulfuric acid, alkanesulfonic acids and aryl sulfonic acids.

The amount of catalyst used depends on the character of the group attached to the nitrogen. Where the alkyl is a primary alkyl, 0.15 ml. of sulfuric acid per mole of ester is sufficient to bring the reaction to completion in twenty-four minutes. If the alkyl is a secondary alkyl, about 1 ml. of sulfuric acid per mole is required to promote the reaction so that it will reach completion in the same length of time. Where the alkyl is tertiary, a sulfuric acid concentration equivalent to 10 ml. per mole will bring the reaction to completion in approximately thirteen minutes.

The use of these catalysts is shown to be effective in the following examples:

EXAMPLE NO. 1

*The nitration of ethyl N-t-butylcarbamate*

To a mixture of 0.1 mole of ethyl N-t-butylcarbamate, 15 ml. of acetic anhydride and 1 ml. of concentrated sulfuric acid, contained in a flask equipped with an efficient stirrer, a thermometer, and an external cooling bath, was added 4.6 ml. (0.103 mole) 95% nitric acid at such a rate that the temperature rose to 40–50° C. This addition required five minutes. The reaction mixture was allowed to stand eleven minutes at which time it was poured onto a saturated solution of sodium chloride. The organic layer was washed with 20% potassium carbonate and dried over anhydrous potassium carbonate. The product thus isolated proved to be pure ethyl N-t-butyl-N-nitrocarbamate as shown by refractive index measurement. The yield was 96%.

In a control experiment using the same quantities of reactants, but eliminating the sulfuric acid, the product isolated was found to consist of 55% nitrated carbamate. In the control the addition was complete in two and one half minutes, the temperature not rising about 30° C.; thus attesting to the enhanced reactivity of the catalyzed reaction.

EXAMPLE NO. 2

*The nitration of ethyl-N-ethylcarbamate*

In an apparatus as described in Example No. 1, 0.201 mole of 95% nitric acid was added to 0.260 mole of acetic anhydride, the temperature being maintained at 20–30° C. To this mixture was added 0.1 ml. of concentrated sulfuric acid. The carbamate was then added in eight minutes, the temperature being maintained at 30–33° C. The reaction mixture was allowed to stand for sixteen minutes at 25–30° C. The product, 95% yield, was isolated as in Example No. 1, and was very nearly 100% pure ethyl N-ethyl-N-nitrocarbamate.

In a control experiment without catalyst the reaction proceeded only 90% of the way to completion in the same length of time.

EXAMPLE NO. 3

*The nitration of ethyl N-butylcarbamate*

The catalyzed nitration and the control nitration were carried out as described in Example No. 2. The catalyzed nitration proceeded to 100% completion whereas the control had proceeded only to 90% completion.

EXAMPLE NO. 4

*The nitration of isopropyl N-isopropyl carbamate*

One mole (145 g.) of isopropyl N-isopropyl carbamate was partially dissolved in 130 ml. of acetic anhydride. One ml. of concentrated sulfuric acid was then added. The mixture was well-stirred and cooled with water, the temperature of the water being preferably between 5° and 10° C. Slightly more than one mole of fuming nitric acid (95%) (46 ml.) was added dropwise at such a rate that the reaction temperature was held between 25° C. and 35° C. After all the nitric acid was added, the mixture was stirred for a few minutes until there was no evidence (temperature rise) of any further reaction.

The mixture was then flash fractionated in vacuo so as to separate the acetic acid from the nitrocarbamate. The nitrocarbamate was washed with water, salt solution and sodium carbonate solution to remove the sulfuric acid and any trace of acetic acid. The nitrocarbamate was freed from mechanically held water by filtration through dry filter paper. The product was pure and a yield of 97% was obtained.

Although one ml. of concentrated sulfuric acid was used in the above example, larger or smaller amounts may be used.

EXAMPLE NO. 5

*Example to show catalytic effect of commercial mixture of alkanesulfonic acids*

To a mixture of 145 g. of isopropyl N-isopropylcarbamate in 130 ml. of acetic anhydride and 2 ml. of a commercially available mixture of low molecular weight alkanesulfonic acids, was added 46 ml. of 95% nitric acid at such a rate that the reaction temperature was held at 15° C. to 20° C. The reaction flask was cooled in a cold water bath. After all the nitric acid had been added, the reaction mixture was allowed to stand for about forty minutes. After flash fractional distillation of the reaction mixture and washing to remove the last trace of acid a 90% yield of pure isopropyl N-nitro-N-isopropylcarbamate was obtained.

EXAMPLE NO. 6

*Example to show the catalytic effect of $BF_3$*

To 0.1 mole of isopropyl N-isopropylcarbamate dissolved in 15 ml. of acetic anhydride containing 1 gram of boron trifluoride was added 4.6 ml. of 95% nitric acid (0.103 mole of 100% nitric acid) in a period of three minutes. The mixture was stirred throughout. The temperature of the reaction mixture was maintained between 25° C. and 30° C. during the addition by means of an external cooling bath. After the addition the reaction flask was removed from the bath and allowed to stand for fifteen minutes during which time the temperature rose to 35° C. and then dropped. The reaction mixture was then thrice washed with saturated sodium chloride, washed once with 20% potassium carbonate, and dried over anhydrous potassium carbonate. The product thus obtained in 95% yield was isopropyl N-isopropyl-N-nitrocarbamate.

EXAMPLE NO. 7

To a mixture of 14.5 grams of isopropyl-N-isopropylcarbamate in 16 ml. of propionic anhydride and 0.2 ml. sulfuric acid was added 4.6 ml. of 95% nitric acid. The nitric acid was added during a period of 3 minutes and the reaction temperature ranged from 20 to 45° C. The mixture was allowed to stand for one hour and then washed with saturated salt solution and sodium carbonate solution to remove the acids and any unchanged propionic anhydride. The refractive index of the product, namely 1.4330 at 23° C., was evidence that the nitration was complete.

EXAMPLE NO. 8

This example is similar to Example No. 6, except that 21 ml. of butyric anhydride was substituted for propionic anhydride, and .25 ml. sulfuric acid and 5.0 ml. nitric acid were used. The refractive index of the product was 1.4324 at 24.5° C., which indicates that nitration was complete.

EXAMPLE NO. 9

To a mixture of 14.5 grams isopropyl-N-isopropylcarbamate and 14 ml. of acetic anhydride and 1 gram p-toluenesulfonic acid monohydrate was added 4.6 ml. 95% nitric acid during a period of about 8 minutes. The nitration temperature was 15–20°. The reaction mixture was then removed from the cooling bath and allowed to stand for fifteen minutes. After washing with saturated salt solution and sodium carbonate solution and drying the product with anhydrous potassium carbonate, the refractive index was 1.4323 at 25°, indicating complete nitration.

EXAMPLE NO. 10

This experiment was similar to Example No. 9, except that 1 gram of 2-naphthol-6-sulfonic acid was used in place of the p-toluenesulfonic acid. The refractive index was 1.4318 at 25°, indicating a composition of 97% nitrocarbamate.

A control was run without using any catalyst. The reaction mixture even after being allowed to stand at room temperature for as long as 25 minutes instead of 15 minutes, allowed in Examples 9 and 10, had a refractive index of only 1.4288 at 25°, indicating that the product contained only 78% of the nitrocarbamate, indicating the necessity of using an acid catalyst in order to obtain a 100% nitration.

In order to determine the effect of increased concentration of sulfuric acid on the nitration the following experiments were performed.

NITRATION OF ISOPROPYL N-ISOPROPYL CARBAMATE USING VARYING AMOUNTS OF SULFURIC ACID

| Experiments | Isopropyl N-Isopropyl Carbamate, moles | Acetic Anhydride, moles | Nitric Acid, moles | Sulfuric Acid, conc., ml. | Total Water[1] moles | Ratio of Acetic Anhydride to water | Refractive Index, 27° C. | Percent Nitrated |
|---|---|---|---|---|---|---|---|---|
| No. 1 | 0.1 | 0.154 | 0.105 | 1 | 0.145 | 0.154/0.145 | 1.4310 | 100 |
| No. 2 | 0.1 | 0.154 | 0.105 | 2 | 0.150 | 0.154/0.150 | 1.4310 | 100 |
| No. 3 | 0.1 | 0.154 | 0.105 | 3 | 0.155 | 0.154/0.155 | 1.4298 | 90 |
| No. 4 | 0.1 | 0.154 | 0.105 | 4 | 0.160 | 0.154/0.160 | 1.4297 | 90 |
| No. 5 | 0.1 | 0.300 | 0.105 | 5 | 0.165 | 0.300/0.165 | 1.4308 | 98 |

[1] Total water is the water formed in the reaction, plus the water present in the 90% nitric acid, plus the water present in the 95% sulfuric acid.

It is apparent that, first, the moles of water introduced into the reaction mixture via reaction itself, the water in the nitration acid which was 16% water, and the water in the sulfuric acid catalyst, must not exceed the moles of the acetic anhydride available. This can be seen by comparing Experiments 2 and 3. Second, the product should be stable in the final reaction mixture. Increased amounts of sulfuric acid will decompose the product even though there is sufficient acid anhydride present. In Experiment 4 even though the material was not completely nitrated decomposition occurred as evidenced by the evolution of gas during the addition of the nitric acid. In Experiment 5 evolution of gas was observed during the addition which took less than 10 minutes. On standing 3 minutes after the addition of the nitric acid the temperature was rising rapidly and the evolution of gas was quite rapid. The reaction mixture had to be quenched immediately in order to stop the decomposition. Consequently there were distinct disadvantages to using large amounts of sulfuric acid even though it can be made to operate so as to give a nitrated product, that is, as the ratio of sulfuric acid to nitric acid approaches the usual mixture used in nitration the product becomes unstable and the reaction unsatisfactory due to decomposition even though there is a sufficient quantity of acid anhydride present.

In the practice of this invention the product may be separated from the reaction mixture by distillation and the process may be a batch process but a continuous process is the preferred embodiment of this invention. When the process is a continuous distillation process and the catalysts referred to above are used, the concentration of the catalysts must be more closely controlled. For example, in the nitration of isopropyl N-isopropyl carbamate, the use of 10 ml. of concentrated sulfuric acid per mole yielded a product which when allowed to stand decomposed spontaneously. When a concentration of 1 ml. per mole was used, the reaction product could be distilled to remove the acetic acid and the remaining excess of the anhydride without decomposing the product. The maximum amount of catalyst that may be used in the preferred process of this invention is the amount that does not lead to decomposition of the reaction mixture under the temperature and pressure conditions used for distillation. The higher the reaction temperature the less the amount of catalyst that may be used, but the preferred amount of catalyst is less than 10 ml. per mole.

One advantage of using a catalyst is an increased rate of reaction which allows the reaction to be completed in a much shorter length of time. This is very important in the nitration reaction as it avoids the formation of by-products and the decomposition of the reaction product, producing a high yield of pure product in a comparatively short period of time.

The nitro compounds may be used as additives for hydrocarbon fuel, particularly diesel fuel and they may also be used as organic solvents.

Certain catalysts have been shown to be of value in the nitration of carbamic acid esters and it is apparent to any one skilled in the art that these same catalysts may be used for other nitration processes.

This application is a continuation-in-part of application Serial No. 427,884, filed May 5, 1954, and now abandoned.

What is claimed is:

1. A process for the preparation of a N-nitro-derivative of an ester of a N-mono-lower alkyl substituted carbamic acid, which comprises mixing said ester with concentrated nitric acid in the presence of a lower alkanoic acid anhydride and adding thereto not more than 0.2 mol./mol. of an acid catalyst selected from the group consisting of sulfuric acid, boron trifluoride, alkane sulfonic acid and aryl sulfonic acid; and separating the product from the reaction mixture.

2. A process for the preparation of a N-nitro-derivative of an ester of a N-mono-lower alkyl substituted carbamic acid, which comprises mixing said ester with concentrated nitric acid in the presence of a lower alkanoic acid anhydride containing an acid catalyst consisting of not more than 0.2 mol./mol. of sulfuric acid; and separating the product from the reaction mixture.

3. A process for the preparation of a N-nitro-derivative of an ester of a N-mono-lower alkyl substituted carbamic acid, which comprises mixing said ester with concentrated nitric acid in the presence of a lower alkanoic acid anhydride and adding thereto a catalyst consisting of boron trifluoride; and separating the product from the reaction mixture.

4. A process for the preparation of a N-nitro-derivative of an ester of a N-mono-lower alkyl substituted carbamic acid, which comprises mixing said ester with concentrated nitric acid in the presence of a lower alkanoic acid anhydride and adding thereto an acid catalyst consisting of an alkane sulfonic acid; and separating the product from the reaction mixture.

5. A process for the preparation of a N-nitro-derivative of an ester of a N-mono-lower alkyl substituted carbamic acid, which comprises mixing said ester with concentrated nitric acid in the presence of a lower alkanoic acid anhydride and adding thereto acid catalyst consisting of an aryl sulfonic acid; and separating the product from the reaction mixture.

6. A process for the preparation of a N-nitro-derivative of an ester of a N-mono-lower alkyl substituted carbamic acid, which comprises mixing the said ester with concentrated nitric acid in the presence of acetic anhydride and not more than 0.2 mol./mol. of sulfuric acid catalyst, and separating the product from the reaction mixture.

References Cited in the file of this patent

UNITED STATES PATENTS

| | | |
|---|---|---|
| 2,449,843 | Filbert | Sept. 21, 1948 |
| 2,758,132 | Thomas | Aug. 7, 1956 |

OTHER REFERENCES

Curry et al.: J. A. C. S. 73 (1951), 5043–6.

Groggins: "Unit Processes in Org. Syn.," 4th ed., pages 20–22 (1952).